Feb. 21, 1956  S. S. MEISLER  2,735,322
PIVOTED HAND TOOL FOR COMPRESSING CLIPS AROUND FLANGES
Filed Jan. 17, 1952
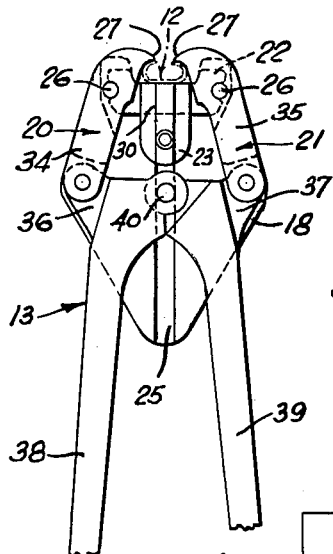
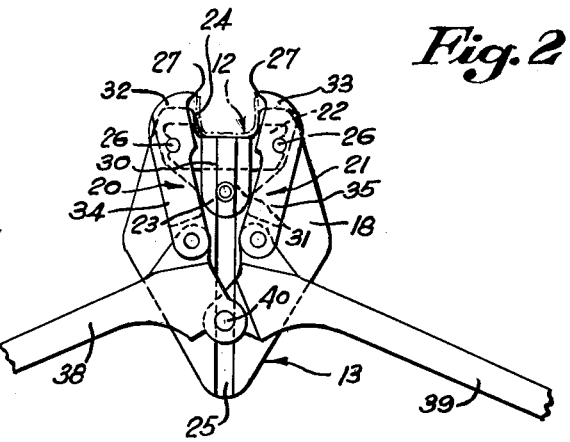
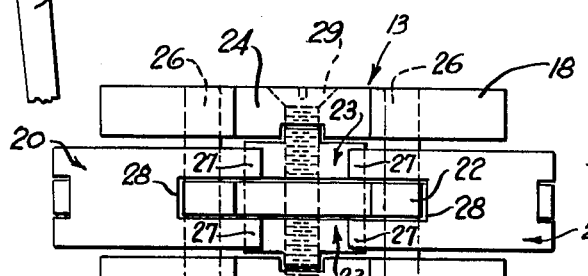
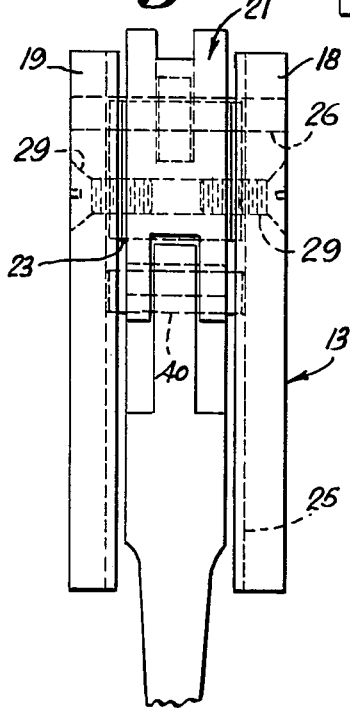
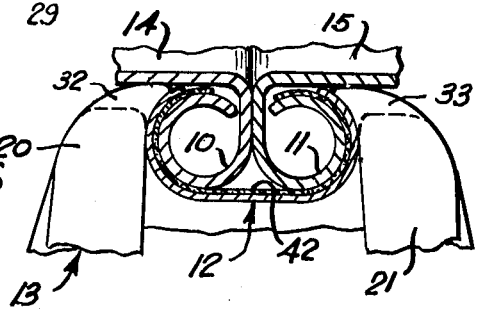
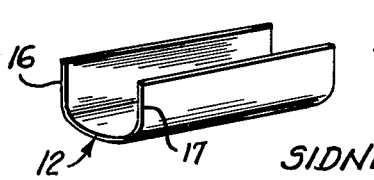
INVENTOR.
SIDNEY S. MEISLER
BY Richards & Geier
ATTORNEYS United States Patent Office 2,735,322
Patented Feb. 21, 1956

2,735,322
PIVOTED HAND TOOL FOR COMPRESSING CLIPS AROUND FLANGES

Sidney S. Meisler, Queens Village, N. Y.

Application January 17, 1952, Serial No. 266,853

1 Claim. (Cl. 81—15)

This invention relates to a device for securing together the abutted ends of two or more drums.

In applicant's copending application, Serial No. 236,670, filed July 13, 1951 which matured into Patent No. 2,674,535, there was described a method and means for shipping a bale of hops in steel drums. One end of the bale is inserted in the open end of one drum with the opposite end of the bale protruding therefrom. The open end of the second drum is inserted over the protruding end of the bale and the circumferential flanges of the open ends of the drums superposed. The superposed flanges are fastened together with clips or the like transversely disposed between opposite sides of the flanges by a tool of special design. The tool, while briefly mentioned and partially illustrated in the copending application, was not specifically claimed which is the primary function of subject application.

It is an object of the instant invention to provide a tool that will secure a metal clip or clamp or the like around the superposed flanges of the ends of two steel drums.

A further object is to provide a tool of simple construction but sufficiently rugged to handle a clip of substantial magnitude.

Another object is to provide a tool that will also preform the flanges prior to the attachment of the clips or clamps.

Other objects of the instant invention will become apparent in the course of the following specification.

In the attainment of the aforesaid objectives the device is constituted of two pivotally mounted jaws. Each jaw has an inside or gripping surface designed to the contour of a substantial portion of the outside surface of each flange. The gripping surface of each jaw member is removed at the center to expose the pivots of the jaws. An anvil support is inserted in the removed portions and is held in place by the pivots of the jaws. An anvil is removably inserted on both sides of the anvil support. The jaws are essentially the weight arms of levers and the power arms of which are pivotally secured to the weight arms of handle members which are in turn pivotally secured to each other by a pivot pin slidable between the plates in a slot intermediate the end extremities of the jaws.

The invention will appear more clearly from the following detailed description when taken in conjunction with the drawings showing by way of example a preferred embodiment of the inventive concept.

In the drawings:

Figure 1 is a plan view of the tool for forming a clamp around the rolled edges of two superposed drums with the jaws of the tool in the closed position with one of the housing plates removed, and constructed in accordance with the principles of this invention;

Figure 2 is a view similar to Figure 1 but in the open position of the jaws;

Figure 3 is a top plan view of the jaws shown in Figure 1 but on an enlarged scale;

Figure 4 is an end view of the tool shown in Figure 1 but on an enlarged scale;

Figure 5 is a perspective view of the clamp formed around the flanges of the drum by the tool shown in Figure 1; and Figure 6 is a fragmentary view of the tool after having formed the clamp around the flanges of two superposed drums.

Referring now in geater detail to the drawings, where like reference numerals indicate like parts, reference numerals 10 and 11 indicate the rolled edges or flanges of the peripheries of the ends of two superposed drums, 12 indicates a clip or a clamp for securing the superposed edges together, and 13 the clamping tool.

The rolled edges or peripheries 10 and 11 of the open ends of the superposed drums 14 and 15 are substantially in the form of circular arcs. The drums are commercial products obtained in the open market and the outside diameters of the superposed flanges are around ⅜".

The clamp or clip 12 is made from any suitable material, such as metal, and is of U-shape as shown especially in Figure 5. The bottom or horizontal portion of the U-shaped member is rounded, as illustrated, to more perfectly fit over the superposed rolled edges. The upright portions or members 16 and 17 of the clamp have a height roughly equal to the diameter of the rolled edges and are spaced apart a distance substantially equal to twice the diameter thereof. By such design, the clamp can be slip fitted over the opposite sides of the superposed rolled edges with the upright portions or members 16 and 17 inwardly directed toward the drum.

To fasten the metal clamp or clip 12 around the superposed rolled edges the clamping tool 13 has been especially designed.

The clamping tool 13 comprises a plate 18, a second and similar plate 19, the coacting jaw members 20 and 21, the anvil support 22, the anvil 23, and means for manipulating the jaw members.

The plates 18 and 19 are identical in shape, in spaced parallel arrangement and actually constitute when assembled with the components a housing for the components. At the top, the plates have similar and aligned slots 24 the width of which is greater than twice the diameter of the rolled edges and the depth of which is greater than the diameter thereof in order that the later described jaw members 20 and 21 can be manipulated around the clamp 12 and superposed rolled edges 10 and 11 as later shown. Each plate further has on the inner surface a longitudinal recess 25 along the longitudinal center line thereof for maintaining the sliding fulcrum of the handles operating the jaws in the proper position as described infra. The recesses 25 are aligned and substantially bisect at 90° the previously mentioned slots 24.

The coacting jaws 20 and 21 are similar but oppositely directed members pivotally mounted between the plates 18 and 19 by the similar pivot pins 26 which are located on opposite sides of the similar and aligned slots 24 in the tops of the plates. Each jaw at the top has an inwardly directed edge 27 while the outer surface of the jaw at the top is along an arcuate line to coact with the space between the drum and the rolled edges as most clearly seen in Figure 6. In the inwardly directed and opposed edges 27 of each jaw is a longitudinal recess 28 (Fig. 3) which exposes the aforementioned pivot pins 26 and divides the opposed inwardly directed edges of the jaws into two portions (Fig. 3). Between the recesses 28 is the anvil support 22 held in place by the previously mentioned exposed pivot pins 26. The width of the anvil support 22 is of course approximately equal to the width of the recesses 28 in the jaw members. As thus described, the split inwardly directed edges of the jaws pivotally secured between the like plates 18 and 19 have no anvil so that an anvil 23 is provided to coact with the split edges of the jaws. Of course, the anvil support 22 could be used without the anvil to lend some support to the clamp or clip 12.

The anvil 23 is an inverted U-shaped member the upright portions or members of which are designed to straddle the anvil support 22. The outer surface of the anvil on each side may have the ribs 30 and 31 which fit into the previously mentioned recesses 25 formed in the plates.

As so far described, the pivotal pins 26 securing the jaw members 20 and 21 between the plates 18 and 19 divide the jaw members into the weight arms 32 and 33 (Fig. 2) and the power arms 34 and 35, respectively.

The end extremities of the power arms 34 and 35 of the jaw members are pivotally connected to the weight arms 36 and 37 of the handles 38 and 39, respectively, the power arms of which are shown extending rearwardly from between the plates. The handles 38 and 39, in turn, are pivotally connected together by the pivot pin 40 which protrudes beyond both sides of the handle members, the protruded ends being slidably inserted in the aligned recesses 25 of the plates.

The plates 18 and 19 are attached on opposite sides of the previously mentioned components by the screws 29 (Fig. 3) which are threaded into the anvil 23.

In operation:

Assume that the rolled edges 10 and 11 around the open ends of two drums 14 and 15 (Fig. 6) are superposed as illustrated and that it is desired to fasten the drums together. It may be that the edges are out of shape, so that by opening the jaws 32 and 33 to span opposite sides of the deformed edges and moving the handles together, the jaws will substantially preform the rolled edges. To make the joint between the drums tight, a strip of any suitable adhesive tape 42 (Fig. 6) may be inserted over the outer surfaces of the edges as illustrated. Next a clamp 12 is inserted over the opposite sides of the edges and over the adhesive tape 42. The jaws of the tool 13 are next opened sufficiently to straddle the clamp 12 with the inwardly directed edges 27 thereof between the drums and the rolled flanges as most clearly seen in Figure 6. By pressing the handles together, the jaws will move inwardly to force the clamp around the contour of the flanges, aided, of course, by the anvil. In the case where a strip is used in place of the clamp, the same sealing strip and tool can be used with equal advantage.

While there is above disclosed but one embodiment of the tool, it is possible to produce still other embodiments without departing from the inventive concept herein disclosed, and it is desired therefore that only such limitations be imposed on the appended claim as are stated therein, or required by the prior art.

What is claimed is:

A device for forming a clamp around the superposed rolled edges of the ends of two drums, the device comprising a housing, said housing comprising spaced parallel plates, said plates having aligned slots to receive said rolled edges and further having aligned recesses in the inner surfaces substantially along the center lines of said plates and bisecting the slots at a right angle, a pair of jaw members coacting with the aligned slots in opposed relationship intermediate said plates, said jaw members having aligned and downwardly directed recesses formed in the opposed surfaces thereof, pivotal mounting means for each jaw member through said plates and recess and dividing each jaw member into a power arm and a weight arm, an anvil support disposed in the recesses of said jaw members and held in place by the pivotal mounting means thereof, an inverted U-shaped anvil disposed over said anvil support, said anvil having a rib on the outer surface of each side coacting with the aligned recesses in said plates, means for removably securing said anvil to said plates, and handle means for the power arms of said jaw members, said handle means comprising two rearwardly extended members, pivotal mounting means for said members slidable in the longitudinal recesses of said plates and dividing each member into a second weight arm and a second power arm, and means for pivotally connecting together one of the second mentioned weight arms to the power arm of one of the jaw members.

References Cited in the file of this patent

UNITED STATES PATENTS

| | | |
|---|---|---|
| 838,008 | Chandler et al. | Dec. 11, 1906 |
| 1,038,109 | Flora | Sept. 10, 1912 |
| 1,893,901 | McGregor et al. | Jan. 10, 1933 |
| 1,901,903 | Edwards | Mar. 21, 1933 |
| 1,920,413 | McGary | Aug. 1, 1933 |
| 1,974,913 | Childress | Sept. 25, 1934 |
| 2,216,579 | Adamson | Oct. 1, 1940 |
| 2,432,306 | Gerrard et al. | Dec. 9, 1947 |

FOREIGN PATENTS

| | | |
|---|---|---|
| 654,988 | France | Apr. 12, 1929 |